(12) United States Patent
Artin

(10) Patent No.: US 8,856,180 B2
(45) Date of Patent: Oct. 7, 2014

(54) SYSTEM AND METHOD FOR FORMATTING MULTIFUNCTIONAL ELECTRONIC BOOKS FOR ELECTRONIC READERS

(75) Inventor: Michael Artin, New York, NY (US)

(73) Assignee: barnesandnoble.com llc, New York, NY (US)

(*) Notice: Subject to any disclaimer, the term of this patent is extended or adjusted under 35 U.S.C. 154(b) by 0 days.

(21) Appl. No.: 13/282,303

(22) Filed: Oct. 26, 2011

(65) Prior Publication Data

US 2012/0131003 A1    May 24, 2012

Related U.S. Application Data

(60) Provisional application No. 61/406,992, filed on Oct. 26, 2010.

(51) Int. Cl.

| G06F 7/00 | (2006.01) |
|---|---|
| G06F 17/30 | (2006.01) |
| G06F 17/24 | (2006.01) |
| G06F 17/22 | (2006.01) |
| G06F 17/21 | (2006.01) |

(52) U.S. Cl.
CPC ............ *G06F 17/211* (2013.01); *G06F 17/24* (2013.01); *G06F 17/2247* (2013.01)
USPC ........................................................ 707/793

(58) Field of Classification Search
USPC ........................................................ 707/793
See application file for complete search history.

(56) References Cited

U.S. PATENT DOCUMENTS

| 5,860,073 A | 1/1999 | Ferrel et al. ................. 707/522 |
|---|---|---|
| 7,814,408 B1 | 10/2010 | Dunietz et al. |
| 7,904,570 B1 | 3/2011 | Kroupa |
| 2002/0116421 A1 | 8/2002 | Fox et al. ..................... 707/526 |
| 2004/0143601 A1 | 7/2004 | Shinozaki ................. 707/104.1 |
| 2006/0129526 A1 | 6/2006 | Sitze |
| 2006/0287982 A1 | 12/2006 | Sheldon et al. |
| 2007/0143292 A1 | 6/2007 | Nozaki et al. |
| 2007/0214218 A1 | 9/2007 | Ward et al. ................... 709/205 |
| 2008/0077851 A1* | 3/2008 | Hesmer et al. ............... 715/234 |
| 2008/0082903 A1 | 4/2008 | McCurdy et al. |
| 2008/0082911 A1* | 4/2008 | Sorotokin et al. ........... 715/236 |
| 2008/0263103 A1 | 10/2008 | McCregor et al. |
| 2009/0049373 A1* | 2/2009 | Sharma et al. ............... 715/234 |
| 2009/0094537 A1 | 4/2009 | Alber |
| 2010/0217884 A2 | 8/2010 | Chaney et al. |
| 2010/0250653 A1 | 9/2010 | Hudgeons et al. |
| 2011/0055683 A1 | 3/2011 | Jiang |
| 2011/0066526 A1 | 3/2011 | Watson |
| 2011/0213670 A1 | 9/2011 | Strutton et al. |

OTHER PUBLICATIONS

International Search Report and Written Opinion, application No. PCT/US11/57923. mailed Mar. 6, 2012.

* cited by examiner

*Primary Examiner* — Hosain Alam
*Assistant Examiner* — Van Oberly
(74) *Attorney, Agent, or Firm* — Winston & Strawn LLP

(57) ABSTRACT

A platform agnostic digital publication format that supports rendered and resizable text, illustrations and graphics, "read to me" features and interactive functionality. The format takes advantage of the alternate renditions feature of the OCF of the EPUB® specification and includes both a ShockWave Flash (SWF) based rendition and a HyperText Markup Language (HTML), Java Script (JS), Cascading Style Sheets (CSS) based implementation. In order to avoid duplicating large components (graphics, audio, etc.), files containing those components are not embedded in the SWF files, but are rather externally referenced by both the SWF and the HTML files. A strict and consistent folder structure and file-naming convention improves efficiency and reduces the potential for error.

22 Claims, 2 Drawing Sheets

US 8,856,180 B2

SYSTEM AND METHOD FOR FORMATTING MULTIFUNCTIONAL ELECTRONIC BOOKS FOR ELECTRONIC READERS

CROSS REFERENCE TO RELATED APPLICATION

This application claims benefit under 35 U.S.C. §119(e) from U.S. Provisional Patent application No. 61/406,992, filed on Oct. 26, 2010, the entirety of which is incorporated by reference herein.

FIELD OF THE INVENTION

The present invention generally relates to systems and methods for formatting electronic books, and more particularly to systems and methods for formats for electronic books with dynamic features.

BACKGROUND OF THE INVENTION

The EPUB® specification is a distribution and interchange format standard for digital publications and documents. EPUB® defines a way of representing, packaging and encoding structured and semantically enhanced Web content, including XHTML, CSS, SVG, images, and other resources, for distribution in a single-file format. EPUB® allows publishers to produce and send a single digital publication file (an ePub file) through distribution and offers consumers interoperability between software/hardware for unencrypted, reflowable digital books and other publications. EPUB® was initially standardized in 2007 as a successor format to the Open eBook Publication Structure or "OEB", which was originally developed in 1999.

Two important components of the EPUB® specification are the Open Packaging Format (OPF) and the OEBPS Container Format (OCF). The OPF specification defines the mechanism by which the various components of an electronic publication are tied together and provides additional structure and semantics to the electronic publication. Specifically, OPF describes and references all components of the electronic publication (e.g. markup files, images, navigation structures), provides publication-level metadata, specifies the linear reading-order of the publication, provides fallback information to use when unsupported extensions are employed and provides a mechanism to specify a declarative global navigation structure (the NCX).

The OCF specification describes a general-purpose container technology in the context of encapsulating ePub publications and optional alternate renditions thereof. As a general container format, OCF collects a related set of files into a single-file container. OCF can be used to collect files in various document formats and for classes of applications. The single-file container enables easy transport of, management of, and random access to, the collection.

CF defines the rules for how to represent an abstract collection of files (the "abstract container") into physical representation within a ZIP archive (the "physical container"). OCF is the required single-file container technology for ePub publications. During the preparation steps in producing an electronic publication, OCF is used as the single-file format when exchanging in-progress publications between different individuals and/or different organizations. When providing an electronic publication from publisher or conversion house (Content Provider) to the distribution or sales channel, OCF is the recommended single-file format to be used as the transport format. When delivering the final publication to an ePub reading system or end-user, OCF is the required format for the single-file container that holds all of the assets that make up the publication.

SUMMARY OF THE INVENTION

The inventors of the present invention have found that the traditional architecture for files for electronic books is insufficient for digital picture books and graphic books with resizable text and graphics, light motion graphics, narration and sound effects. The present invention is a platform agnostic digital book format that supports rendered and resizable text, illustrations and graphics, "read to me" features and interactive functionality. The format takes advantage of the alternate renditions feature of the OCF of the EPUB® specification and includes both a ShockWave Flash (SWF) based rendition and a HyperText Markup Language (HTML), Java Script (JS), Cascading Style Sheets (CSS) based implementation of an ePicture Book. In order to avoid duplicating large components (graphics, audio, etc.), files containing those components are not embedded in the SWF files, but are rather externally referenced by both the SWF and the HTML files. A strict and consistent folder structure and file-naming convention improves efficiency and reduces the potential for error.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

The format of the present invention is appropriate for a wide variety of enhanced ebook content, including for electronic children's picture books.

Throughout this document references are made to "pages" for simplicity, understanding that a page of the publication might correspond to a two-page spread of the corresponding physical book. Some of the goals achieved by the present invention include a well defined and documented format, optimal multi-platform support with a single zipped file to maintain, ingest, and distribute, and fully supported Digital Rights Management, DRM.

The format of the present invention makes use of the Open Packaging Format (OPF) and the OEBPS Container Format (OCF) that are part of the EPUB® specification described above for organizing, specifying, and packaging content data for electronic content. Using these standard specifications provides several benefits. The OPF and OCF specifications are well understood and supported, so reading systems that support OPF and OCF can support the format of the present invention with certain modifications and extensions. The DRM in place to handle traditional ePub documents can be used with the enhanced ePub publications of the present invention without modification.

The format of the present invention separates the structural description of a publication, its media elements, and its interactivity logic. This architectural separation within the format of an electronic publication provides several benefits. Because the media assets, by far the largest elements of any advanced electronic publication, are separated by the present invention from the interactivity logic and the structure, multiple renditions of the logic can exist within one document, without the electronic publication growing unreasonably large.

Because there can be multiple renditions of the interactivity logic, electronic documents according to the present invention can make use of different technologies supported by different devices (e.g., Flash on an Android device, HTML5 and JavaScript on an iOS device).

Figure 1:
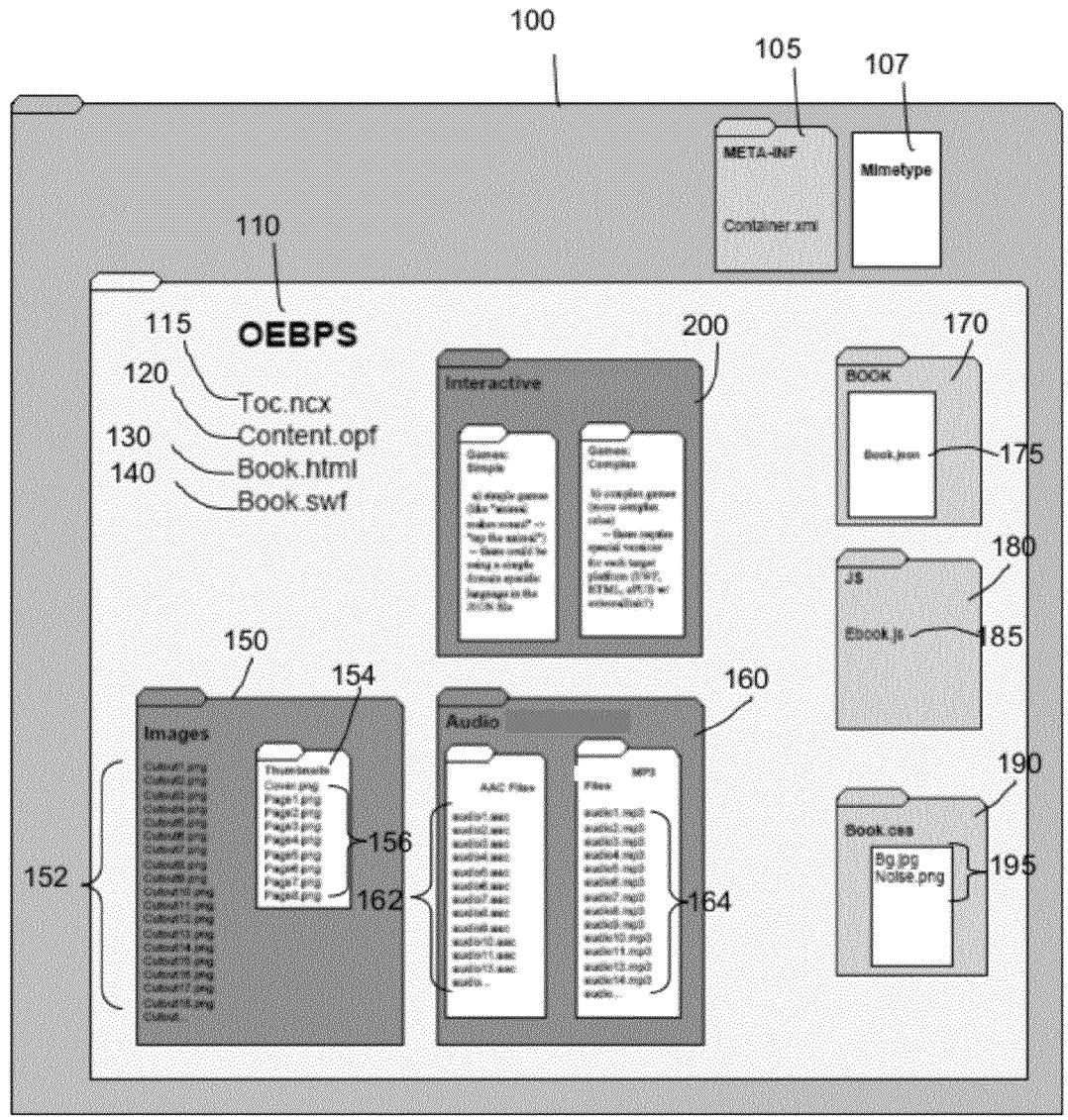
FIG. 1 illustrates the structure of the electronic publication of the present invention.

One of the important aspects of the present invention is the folder structure employed. An example of an enhanced ePub file 100 using the folder structure of the present invention is illustrated in FIG. 1. Following the OCF format specification, there are two root-level folders, META-INF 105 and OEBPS 110. As with traditional ePub files, the enhanced ePub container 100 of the present invention includes the mimetype 107.

The OEBPS folder 110 serves as the root of both the SWF and the XHTML versions of the publication. The OEBPS folder 110 contains at least the following files: Toc.ncx 115; Content.opf 120; Book.html 130; and Book.swf 140. Content.opf 120 is a file that contains publication metadata and a manifest of the files that make up the electronic publication.

Book.swf 140 is the primary SWF file that drives the Flash rendition of the electronic publication. This SWF file 140 includes publication-level logic, including page turns, navigation scrubber, reading mode, etc. The primary SWF file 140 loads individual page-level SWF files to render the individual pages of the electronic publication. The page-level SWF files load background and animation images from the IMAGES subdirectory 150 and audio from the AUDIO subdirectory 160 as further described below.

Book.html 130 is the primary HTML file that drives the HTML/JS rendition of the electronic publication. The HTML Architecture is similar to the Flash rendition architecture. Book.html 130 is essentially an HTML/JavaScript application that loads and unloads pages according to user navigation, and handles memory by adding and deleting nodes of the Document Object Model, DOM, tree. All graphic and audio content is referenced from the same directories, e.g. IMAGES 150, AUDIO 160, and are the same files as used by the Flash rendition.

Both the Book.html 130 and the Book.swf 140 primary files make use of the Book 170, JS 180 and Book.CSS 190 folders as further described below.

Additionally, OEBPS folder 110 contains the following subfolders: IMAGES 150; AUDIO 160; BOOK 170; JS 180; CSS 190; Interactive 200.

IMAGES subfolder 150 contains all of the images 152 used on the pages in the electronic book contained in enhanced ePub file 100. The images 152 contained in subfolder 150 are preferably in either the PNG or JPG format. IMAGES folder 150 preferably includes a subfolder THUMBNAILS 154. Electronic books are broken typically into "spreads" (typically facing pages from the print version). Each spread has a thumbnail reference (image), the actual width and height of the image of the spread, an identifier of the image for the spread, and "narration" entries. Subfolder THUMBNAILS 154 contains thumbnail images 156 of each spread (e.g., two facing pages) in the electronic book for use by a book-level navigation scrubber in an electronic reader capable of reading the electronic book.

AUDIO subfolder 160 contains all the audio files 162, 164 associated with the electronic publication contained in the enhanced ePub file 100.

BOOK subfolder 170 contains the JSON data files 175 used for the page layout for the electronic publication contained in the enhanced ePub file 100. The size, position, and contents of each text block on a page is described and associated with each book page. The primary file in BOOK subfolder 170 is book.json 175. This file contains the structural definition of the publication in the form of JSON data.

Book.json 175 begins with publication level data, including the following (note that the actual values are provided exemplary purposes only):

```
"title": "The Title of the Publication",
"author": "Author's Name",
"width":1536,
"height":768,
"backCoverPromo":"backcoverpromo",
```

The width and height values specify the pixel dimensions of the source assets of the electronic publication. An electronic reader displaying the enhanced ePub publication uses these values to scale the displayed version of the publication to the size of the view screen of the electronic reader. For example, on a screen of an electronic reader with dimensions of 1024×600, the publication described above would display at a resolution of 1024×512.

Following the publication-level metadata in Book.json 175, is an array of spreads, specified by:

```
"spreads":
[
   ...
]
```

Each element of the array of spreads preferably has the following format. Again, the values used herein are exemplary only.

```
{
    "thumbId": "thumb_11-12_0",
    "width": 1536,
    "height": 768,
    "assets":
    [
        {
            "itemref": "spread_11-12_0"
        }
    ]
    ,
    "narration":
    [
        {
            "itemref": "narration_11-12_01",
            "id": "narration0",
            "audio": "audio_11-12_01",
            "initial-width": 555,
            "initial-height": 232,
            "initial-left": 111,
            "initial-top": 47,
            "width": 966,
            "height": 386,
            "left": 59,
            "top": 60
        }
        ,
        {
            "itemref": "narration_11-12_02",
            "id": "narration1",
            "audio": "audio_11-12_02",
            "initial-width": 502,
            "initial-height": 138,
            "initial-left": 933,
            "initial-top": 596,
            "width": 862,
```

-continued

```
        "height": 219,
        "left": 661,
        "top": 547
      }
    ]
    ,
    "activity":
    [
      {
        "itemref": "",
        "autoplay": false
      }
    ]
}
```

"thumId," as used above, references a thumbnail image 156 in IMAGE directory 150 and is used to represent the spread in a "thumbnail scrubber" navigation method.

"Width" and "height," as used above, specify the pixel dimensions of the assets in the particular spread being described. Generally, the width and height of a spread corresponds to the book-level width and height dimensions, but can vary depending on the spread.

"Assets" as used above is an array of references to image, animation, and interactivity assets used in this spread. As previously described, the JSON file 175 has links to the images 152, 154 in the Image subfolder 150 and to the Audio files 162, 164 in the Audio subfolder 160.

"Narration" is an array of specifications of textboxes on the screen. Each element of that array specifies the image asset used when that textbox is enlarged, the audio file (if any) that accompanies that text box, the bounding box of the unenlarged text box (used as the triggering hotspot to enlarge the box) and the resulting bounding box of the enlarged text box. The narration array is an optional component.

"Activity" is a specification of the activity that occurs on that spread, as specified in the assets portion of the spread description. It is an optional component.

Other data can be included in the spread description, allowing the format to extend its functionality.

CSS subfolder 190 contains all the CSS files 195 pertaining to the electronic publication contained in the enhanced ePub file 100. These files 195 add styles to the document without having to repeat code in HTML at each individual instance. Using the CSS files 195, the style need only be applied once.

JS subfolder 185 contains all JavaScript files 185 pertaining to the electronic publication contained in the enhanced ePub file 100. JavaScript files 185 add interactivity functionality to pages in the electronic publication, for example, pop up or text boxes.

Interactive subfolder 200 contains files required to provide interactive features to the electronic publication.

As previously described, presently, there are two primary architectures for rendering electronic publications, the Flash Rendition Architecture and the HTML/JS Rendition Architecture.

The Flash rendition of the electronic publication is driven by a primary SWF file Book.swf 140. This SWF 140 includes publication-level logic, including page turns, navigation scrubber, reading mode, etc. The primary SWF file 140 loads individual page-level SWF files to render the individual pages of the electronic publication. The page-level SWF files load background and animation images from the IMAGES subdirectory 150, audio from the AUDIO subdirectory 160, etc. The page-level SWF files open data files from the BOOK directory 170 to position elements on the page being rendered. In this way, the page-level SWF files are largely similar to one another, unless they include activities. For most electronic publications, the page-level SWF files may be identical except for the data files to which they point.

The HTML/JS Rendition Architecture is similar to the Flash rendition architecture, where the publication is driven by a book level HTML file, Book.html 130. Book.html 130 is essentially an HTML/JavaScript application that loads and unloads pages according to user navigation, and handles memory by adding and deleting nodes of the Document Object Model, DOM, tree. All graphic and audio content is referenced from the same directories, e.g. IMAGES 150, AUDIO 160, and are the same files as used by the Flash rendition.

The format of the container 100 of the present invention is structurally an ePub file. Everything a reader application needs to present the content as intended is listed as an <item> in the <manifest> section of the enhanced ePub file 100.

However, in contrast to a traditional ePub structure, there is a JSON file 175 contained in the BOOK directory 170 in the enhanced ePub container 100. This JSON file 175 contains metadata that tells the reader application how the various pieces of the electronic publication should be presented. This structure is not taught or suggested by traditional ePub container structure.

In operation, when an electronic reader loads an electronic publication according to the format of the present invention, the enhanced ePub file 100 is digested and the name/value pairs of IDs and file paths are stored. The JSON file 175, the roadmap to the electronic publication, is read and converted into an in-memory data structure. The first spread in the book, as referenced by the JSON file 175, is drawn or rendered.

Each narration entry associated with a spread contains a "hit zone" that tells the reader where a tap should be interpreted as a request to zoom into the text of a narration, how big the zoomed-in image should be, and whether or not there is an audio clip associated with this narration asset. "Hit zones" for any narration assets are remembered for that page. If a user taps in a hit zone, the narration text for that hit zone is displayed in a zoomed state.

If there is an audio clip accompanying the narration text, a play button is displayed at the upper-right of the zoomed narration area. Tapping the play button plays the audio clip. The reference to an audio clip in the JSON file 175 is the identifier for the entry 162, 164 in the AUDIO directory 160.

The enhanced ePub files of the present invention are stored in a tangible medium, such as a memory, in a distribution server and on user's local devices.

Figure 2:
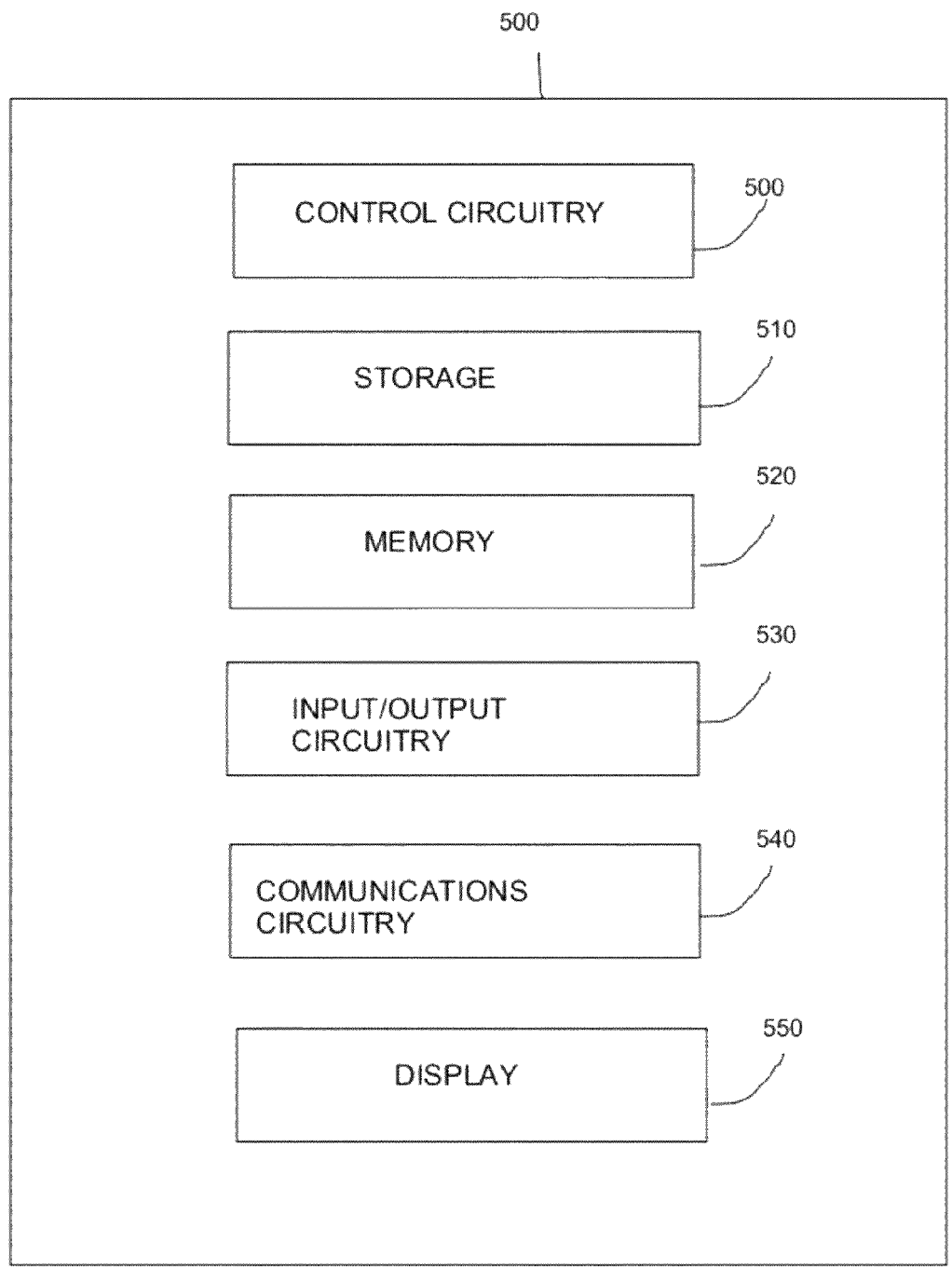
FIG. 2 depicts an exemplary electronic reader capable of reading the electronic publication.

FIG. 2 illustrates an exemplary local device 500. As appreciated by those skilled in the art, the local device 500 can take many forms capable of operating the present invention. As previously described, in a preferred embodiment the local device 500 is a mobile electronic device, and in an even more preferred embodiment device 500 is an electronic reader device. Electronic device 500 can include control circuitry 500, storage 510, memory 520, input/output ("I/O") circuitry 530, communications circuitry 540, and display 550. In some embodiments, one or more of the components of electronic device 500 can be combined or omitted, e.g., storage 510 and memory 520 may be combined. As appreciated by those skilled in the art, electronic device 500 can include other components not combined or included in those shown in FIG. 2, e.g., a power supply such as a battery, an input mechanism, etc.

Electronic device 500 can include any suitable type of electronic device. For example, electronic device 500 can include a portable electronic device that the user may hold in his or her hand, such as a digital media player, a personal e-mail device, a personal data assistant ("PDA"), a cellular telephone, a handheld gaming device, a tablet device or an eBook reader. As another example, electronic device 500 can include a larger portable electronic device, such as a laptop computer. As yet another example, electronic device 500 can include a substantially fixed electronic device, such as a desktop computer.

Control circuitry 500 can include any processing circuitry or processor operative to control the operations and performance of electronic device 500. For example, control circuitry 500 can be used to run operating system applications, firmware applications, media playback applications, media editing applications, or any other application. Control circuitry 500 can drive the display 550 and process inputs received from a user interface, e.g., the display 550 if it is a touch screen.

Orientation sensing component 505 includes orientation hardware such as, but not limited to, an accelerometer or a gyroscopic device and the software operable to communicate the sensed orientation to the control circuitry 500. The orientation sensing component 505 is coupled to control circuitry 500 that controls the various input and output to and from the other various components. The orientation sensing component 505 is configured to sense the current orientation of the portable mobile device 500 as a whole. The orientation data is then fed to the control circuitry 500 which control an orientation sensing application. The orientation sensing application controls the graphical user interface (GUI), which drives the display 550 to present the GUI for the desired mode.

Storage 510 can include, for example, one or more storage mediums including a hard-drive, solid state drive, flash memory, permanent memory such as ROM, any other suitable type of storage component, or any combination thereof. Storage 510 can store, for example, media content, e.g., eBooks, music and video files, application data, e.g., software for implementing functions on electronic device 500, firmware, user preference information data, e.g., content preferences, authentication information, e.g., libraries of data associated with authorized users, transaction information data, e.g., information such as credit card information, wireless connection information data, e.g., information that can enable electronic device 500 to establish a wireless connection, subscription information data, e.g., information that keeps track of podcasts or television shows or other media a user subscribes to, contact information data, e.g., telephone numbers and email addresses, calendar information data, and any other suitable data or any combination thereof.

Memory 520 can include cache memory, semi-permanent memory such as RAM, and/or one or more different types of memory used for temporarily storing data. In some embodiments, memory 520 can also be used for storing data used to operate electronic device applications, or any other type of data that can be stored in storage 510. In some embodiments, memory 520 and storage 510 can be combined as a single storage medium.

I/O circuitry 530 can be operative to convert, and encode/decode, if necessary analog signals and other signals into digital data. In some embodiments, I/O circuitry 530 can also convert digital data into any other type of signal, and vice-versa. For example, I/O circuitry 530 can receive and convert physical contact inputs, e.g., from a multi-touch screen, i.e., display 550, physical movements, e.g., from a mouse or sensor, analog audio signals, e.g., from a microphone, or any other input. The digital data can be provided to and received from control circuitry 500, storage 510, and memory 520, or any other component of electronic device 500. Although I/O circuitry 530 is illustrated in FIG. 2 as a single component of electronic device 500, several instances of I/O circuitry 530 can be included in electronic device 500.

Electronic device 500 can include any suitable interface or component for allowing a user to provide inputs to I/O circuitry 530. For example, electronic device 500 can include any suitable input mechanism, such as a button, keypad, dial, a click wheel, or a touch screen, e.g., display 550. In some embodiments, electronic device 500 can include a capacitive sensing mechanism, or a multi-touch capacitive sensing mechanism.

In some embodiments, electronic device 500 can include specialized output circuitry associated with output devices such as, for example, one or more audio outputs. The audio output can include one or more speakers, e.g., mono or stereo speakers, built into electronic device 500, or an audio component that is remotely coupled to electronic device 500, e.g., a headset, headphones or earbuds that can be coupled to device 500 with a wire or wirelessly.

Display 550 includes the display and display circuitry for providing a display visible to the user. For example, the display circuitry can include a screen, e.g., an LCD screen, that is incorporated in electronics device 500. In some embodiments, the display circuitry can include a coder/decoder (Codec) to convert digital media data into analog signals. For example, the display circuitry or other appropriate circuitry within electronic device 1 can include video Codecs, audio Codecs, or any other suitable type of Codec.

The display circuitry also can include display driver circuitry, circuitry for driving display drivers, or both. The display circuitry can be operative to display content, e.g., media playback information, application screens for applications implemented on the electronic device 500, information regarding ongoing communications operations, information regarding incoming communications requests, or device operation screens, under the direction of control circuitry 500. Alternatively, the display circuitry can be operative to provide instructions to a remote display.

Communications circuitry 540 can include any suitable communications circuitry operative to connect to a communications network and to transmit communications, e.g., data from electronic device 500 to other devices within the communications network. Communications circuitry 540 can be operative to interface with the communications network using any suitable communications protocol such as, for example, Wi-Fi, e.g., a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VOIP, or any other suitable protocol.

Electronic device 500 can include one more instances of communications circuitry 540 for simultaneously performing several communications operations using different communications networks, although only one is shown in FIG. 2 to avoid overcomplicating the drawing. For example, electronic device 500 can include a first instance of communications circuitry 540 for communicating over a cellular network, and a second instance of communications circuitry 540 for communicating over Wi-Fi or using Bluetooth. In some embodiments, the same instance of communications circuitry 540 can be operative to provide for communications over several communications networks.

In some embodiments, electronic device 500 can be coupled to a host device such as digital content control server for data transfers, synching the communications device, software or firmware updates, providing performance information to a remote source, e.g., providing riding characteristics to a remote server, or performing any other suitable operation that can require electronic device 500 to be coupled to a host device. Several electronic devices 500 can be coupled to a single host device using the host device as a server. Alternatively or additionally, electronic device 500 can be coupled to several host devices, e.g., for each of the plurality of the host devices to serve as a backup for data stored in electronic device 500.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

I claim:

1. An electronic publication stored on a non-transitory tangible computer medium, the electronic publication comprising:
   at least one root level folder, wherein the root level folder is an Open eBook Publication Structure, OEBPS, folder;
   an image subfolder contained in the at least one root level folder, the image subfolder containing image files used in the electronic publication;
   an audio subfolder contained in the at least one root level folder, the audio subfolder containing audio files used in the electronic publication;
   a book subfolder contained in the at least one root level folder, the book subfolder containing a data file, the data file containing JavaScript Object Notation, JSON, data;
   a JavaScript subfolder contained in the at least one root level folder, the JavaScript subfolder containing JavaScript files, the JavaScript files providing interactivity functionality to the electronic publication;
   a Cascading Style Sheet subfolder contained in the at least one root level folder, the Cascading Style Sheet subfolder containing Cascading Style Sheet files; and
   a primary file contained in the at least one root level folder, the primary file containing instructions and, using data from the data file, JavaScript files from the JavaScript subfolder and Cascading Style Sheet files from the Cascading Style Sheet subfolder, is capable of operation on a device for rendering the electronic publication, the primary file linking to the audio files in the audio subfolder and linking to the image files in the image subfolder.

2. The electronic publication according to claim 1, wherein the data in the data file specifies at least one page layout for the electronic publication and containing links to the image files and the audio files.

3. The electronic publication according to claim 1, further comprising a second root level folder, the second root level folder being a META-INF folder.

4. The electronic publication according to claim 1, wherein the primary file is a SWF file.

5. The electronic publication according to claim 4, wherein the SWF file loads page level SWF files for rendering individual pages of the electronic publication when executed by the device, and wherein links to the image and audio files are contained in the page level SWF files.

6. The electronic publication according to claim 1, wherein the primary file is a HTML/JS file.

7. The electronic publication according to claim 6, wherein the HTML/JS file renders individual pages of the electronic publication when executed by the device.

8. The electronic publication according to claim 1, wherein the primary file is a first primary file, the electronic publication further comprising:
   a second primary file, wherein the first primary file supports rendering of the electronic publication according to a first architecture and the second primary file supports rendering of the electronic publication according to a second architecture.

9. The electronic publication according to claim 8, wherein the first primary file is an HTML/JS file and the second primary file is a SWF file.

10. The electronic publication according to claim 8, wherein both the first primary file and the second primary file link to the same audio and image files.

11. The electronic publication according to claim 1, wherein image subfolder further contains a thumbnail subfolder, the thumbnail subfolder containing thumbnail images of individual pages of the electronic publication.

12. A method of creating an electronic publication comprising:
    creating at least one root level folder, wherein the root level folder is an Open eBook Publication Structure, OEBPS, folder;
    creating an image subfolder in the at least one root level folder;
    populating the image subfolder with image files used in the electronic publication;
    creating an audio subfolder contained in the at least one root level folder;
    populating the audio subfolder with audio files used in the electronic publication;
    creating a book subfolder in the at least one root level folder, the book subfolder containing a data file;
    populating the data file with JavaScript Object Notation, JSON, data;
    creating a JavaScript subfolder in the at least one root level folder;
    populating the JavaScript subfolder with JavaScript files, the JavaScript files providing interactivity functionality to the electronic publication;
    creating a Cascading Style Sheet subfolder in the at least one root level folder;
    populating the Cascading Style Sheet subfolder with Cascading Style Sheet files; and
    creating a primary file in the at least one root level folder, the primary file containing instructions and, using data from the data file JavaScript files from the JavaScript subfolder and Cascading Style Sheet files from the Cascading Style Sheet subfolder, is capable of operation on a device for rendering the electronic publication, the primary file linking to the audio files in the audio subfolder and linking to the image files in the image subfolder.

13. The method according to claim 12, wherein the data in the data file specifies at least one page layout for the electronic publication and containing links to the image files and the audio files.

14. The method according to claim 12, further comprising creating a second root level folder, the second root level folder being a META-INF folder.

15. The method according to claim 12, wherein the primary file is a SWF file.

16. The method according to claim 15, wherein the SWF file loads page level SWF files for rendering individual pages of the electronic publication when executed by the device, and wherein links to the image and audio and image files are contained in the page level SWF files.

17. The method according to claim 12, wherein the primary file is a HTML/JS file.

18. The method according to claim 17, wherein the HTML/JS file renders individual pages of the electronic publication when executed by the device.

19. The method according to claim 12, wherein the primary file is a first primary file, the method further comprising:
   creating a second primary file, wherein the first primary file supports rendering of the electronic publication according to a first architecture and the second primary file supports rendering of the electronic publication according to a second architecture.

20. The method according to claim 19, wherein the first primary file is an HTML/JS file and the second primary file is a SWF file.

21. The method according to claim 19, wherein both the first primary file and the second primary file link to the same audio and image files.

22. The method according to claim 12 the method further comprising:
   creating a thumbnail subfolder in the image subfolder; and
   populating the thumbnail subfolder with thumbnail images of individual pages of the electronic publication.

* * * * *